(12) United States Patent
Kamei et al.

(10) Patent No.: US 11,451,676 B2
(45) Date of Patent: Sep. 20, 2022

(54) EXTENDED OPERATION DEVICE AND IMAGE FORMING APPARATUS

(71) Applicants: Kenji Kamei, Kanagawa (JP); Reo Kojima, Kanagawa (JP)

(72) Inventors: Kenji Kamei, Kanagawa (JP); Reo Kojima, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 17/081,580

(22) Filed: Oct. 27, 2020

(65) Prior Publication Data

US 2021/0168246 A1 Jun. 3, 2021

(30) Foreign Application Priority Data

Nov. 28, 2019 (JP) .............................. JP2019-215582

(51) Int. Cl.
*H04N 1/00* (2006.01)
*G06F 3/02* (2006.01)

(52) U.S. Cl.
CPC ....... *H04N 1/00384* (2013.01); *G06F 3/0219* (2013.01); *H04N 1/00559* (2013.01)

(58) Field of Classification Search
None
See application file for complete search history.

(56) References Cited

U.S. PATENT DOCUMENTS

| | | | |
|---|---|---|---|
| 5,144,302 A * | 9/1992 | Carter | B41J 5/10 341/20 |
| 5,493,365 A | 2/1996 | Matsui et al. | |
| 5,881,333 A * | 3/1999 | Takahashi | H04N 1/00538 399/2 |
| 6,595,424 B1 * | 7/2003 | Harrison | G06F 1/163 235/462.45 |
| 6,972,945 B1 * | 12/2005 | Kozak | G06F 1/1632 361/679.08 |
| 2007/0076379 A1 * | 4/2007 | Hong | G06F 1/1613 361/728 |

(Continued)

FOREIGN PATENT DOCUMENTS

CN 201035511 Y * 3/2008
JP 5-144512 6/1993

(Continued)

*Primary Examiner* — Dung D Tran
(74) *Attorney, Agent, or Firm* — Harness, Dickey & Pierce, P.L.C.

(57) ABSTRACT

An extended operation device mountable to and demountable from an apparatus body includes an extended operation device body, an operation device, and a pair of insertion portions. The pair of insertion portions extend in a first direction parallel to an operation surface of the operation device with respect to the extended operation device body. One insertion portion and the other insertion portion of the pair of insertion portions are provided on one side and the other side, respectively, of the extended operation device body with respect to a central position of the extended operation device body in a second direction that is parallel to the operation surface of the operation device and intersects the first direction. The pair of insertion portions are inserted into a pair of insertion holes provided in the apparatus body to mount the extended operation device to the apparatus body.

15 Claims, 5 Drawing Sheets

(56) References Cited

U.S. PATENT DOCUMENTS

| | | | |
|---|---|---|---|
| 2009/0160681 A1* | 6/2009 | Chen | G06F 3/021 |
| | | | 341/23 |
| 2020/0099801 A1* | 3/2020 | Funakawa | G06F 3/04886 |
| 2020/0249888 A1* | 8/2020 | Kurita | H04N 1/00411 |
| 2020/0272091 A1* | 8/2020 | Ashikagaya | G03G 15/2035 |

FOREIGN PATENT DOCUMENTS

| | | |
|---|---|---|
| JP | 7-099553 | 4/1995 |
| JP | 10-243138 | 9/1998 |
| JP | 2000-106614 | 4/2000 |
| JP | 2008-108148 | 5/2008 |

* cited by examiner

EXTENDED OPERATION DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2019-215582, filed on Nov. 28, 2019, in the Japan Patent Office, the entire disclosure of which is hereby incorporated by reference herein.

BACKGROUND

Technical Field

Embodiments of the present disclosure relate to an extended operation device and an image forming apparatus.

Description of the Related Art

There is known an extended operation device, such as a numeric keypad device, that is detachably provided in an image forming apparatus such as a copying machine, a printer, a facsimile, or a multifunction peripheral thereof.

For example, an operation unit body to which three types of keypad device such as a numeric keypad can be attached and detached from are provided in an apparatus main body. Each of the keypad devices can be fitted into a dedicated space provided in the operation unit body.

Further, as a different example of an extended operation device, there have been conventional extended operation devices of a type in which a numeric keypad device can be attached by screwing later to an operation panel provided on an image forming apparatus. In the case of such a configuration, an operation of screwing or removing screws is necessary every time the numeric keypad is attached or detached.

SUMMARY

In an aspect of the present disclosure, an extended operation device mountable to and demountable from an apparatus body includes an extended operation device body, an operation device, and a pair of insertion portions. The pair of insertion portions extend in a first direction parallel to an operation surface of the operation device with respect to the extended operation device body. One insertion portion and the other insertion portion of the pair of insertion portions are provided on one side and the other side, respectively, of the extended operation device body with respect to a central position of the extended operation device body in a second direction that is parallel to the operation surface of the operation device and intersects the first direction. The pair of insertion portions are inserted into a pair of insertion holes provided in the apparatus body to mount the extended operation device to the apparatus body.

In another aspect of the present disclosure, an image forming apparatus includes the apparatus body. The extended operation device is mountable to and demountable from the apparatus body.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Embodiments of the present disclosure are described below with reference to the drawings. Note that identical reference numerals are assigned to identical components or equivalents and redundant descriptions are summarized or omitted accordingly.

Figure 1:
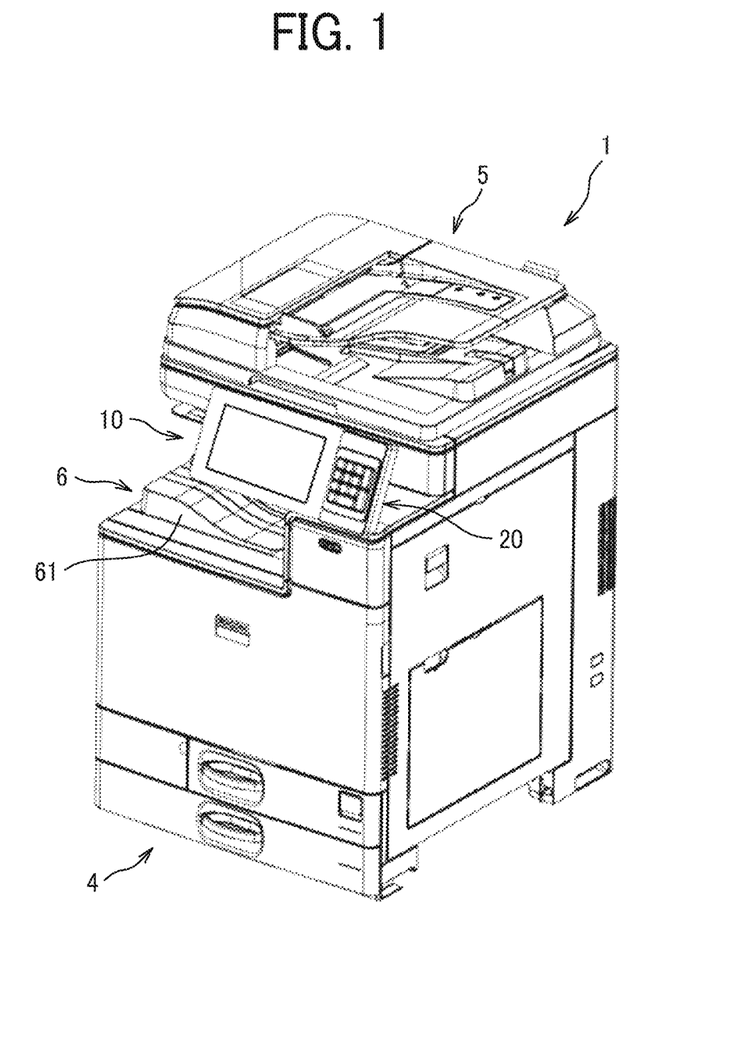
FIG. 1 is a perspective view of an image forming apparatus.

An image forming apparatus 1 according to an embodiment of the present disclosure, which is illustrated in FIG. 1, is a multifunction peripheral having functions of a printer, a facsimile, a copying machine, and the like. However, the image forming apparatus 1 may include any one or combination of these functions.

The image forming apparatus 1 includes a sheet feeder 4 including a sheet feeding tray and the like, a document reader 5, a sheet ejection device (or a recording medium ejection device) 6 including a sheet ejection tray 61. The image forming apparatus 1 also includes an image bearer, a transfer unit, a fixing device, and the like inside the image forming apparatus 1.

When a printing operation is started, a sheet as a recording medium is supplied from the sheet feeder 4 to the inside of the image forming apparatus 1. Next, an image is transferred from image data of a print job to the image bearer in an image forming process. Then, the image is transferred from the image bearer to the sheet conveyed through the conveyance path. The sheet after the transfer is conveyed to the fixing device and toner of the image on the sheet is fixed by the fixing device, and the sheet is ejected onto the sheet ejection tray 61.

An operation panel 10 serving as a body-side operation device is provided on an upper portion of a front side of a body of the image forming apparatus 1. The operation panel 10 is the operation device for an operator to input a print command or the like, and a touch panel system is adopted in the present embodiment. However, the present embodiment is not limited to the touch panel system, and for example, a button type panel system may be used.

A numeric keypad device 20 as an extended operation device or a function extension device is detachably provided with respect to the operation panel 10. In recent years, for example, a touch panel system is often employed for an operation panel. In such a system, some operations may be necessary until the numbers of 0 to 9 are displayed on the operation panel so that the numbers of 0 to 9 can be input. However, some operators may feel that such operations are troublesome and the numeric keypad device 20 has better operability. Therefore, mounting the numeric keypad device 20 to the operation panel 10 can enhance the operability of the operation device of the image forming apparatus 1.

The vertical width of the numeric keypad device 20 (i.e., the longitudinal width of the numeric keypad device 20) is substantially the same as the vertical width of the operation panel 10. In a state in which the numeric keypad device 20 is mounted to the operation panel 10, a panel surface of the operation panel 10 and a surface of a body of the numeric keypad device 20 are substantially at the same height. With at least one of the above-described arrangements, the design of the operation device provided on the front side of the body of the image forming apparatus 1 can be enhanced in the state in which the numeric keypad device 20 is mounted to the operation panel 10.

Figure 2:
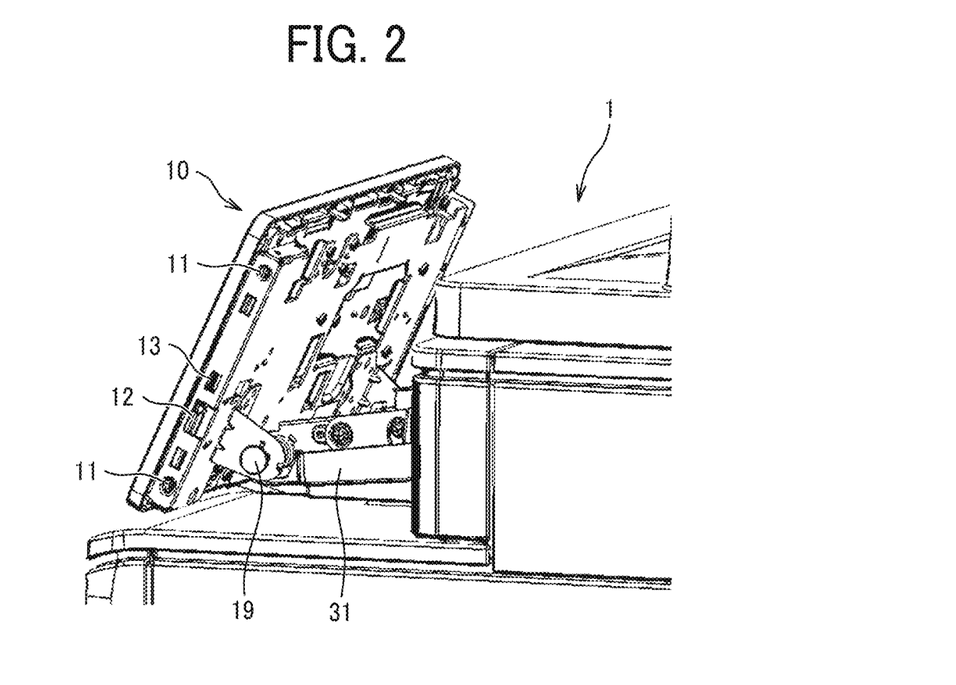
FIG. 2 is a perspective view of an operation panel and movable arms supporting the operation panel.

As illustrated in FIG. 2, a pair of arms 31 is provided on the body of the image forming apparatus 1. The operation panel 10 is supported by the pair of arms 31 so as to be rotatable with respect to the body of the image forming apparatus 1 (or rotatable about a fulcrum 19). By rotation operation of the operation panel 10 with respect to the body of the image forming apparatus 1, a panel part of the operation panel 10 can be oriented in a direction in which the operator can easily operate the operation panel 10.

The operation panel 10 has a pair of pin insertion holes 11 as a pair of insertion holes, a universal serial bus (USB) slot 12, and a hook hole 13 on a lateral side of the operation panel 10. The USB slot 12 is disposed between the pair of pin insertion holes 11.

Figure 3:
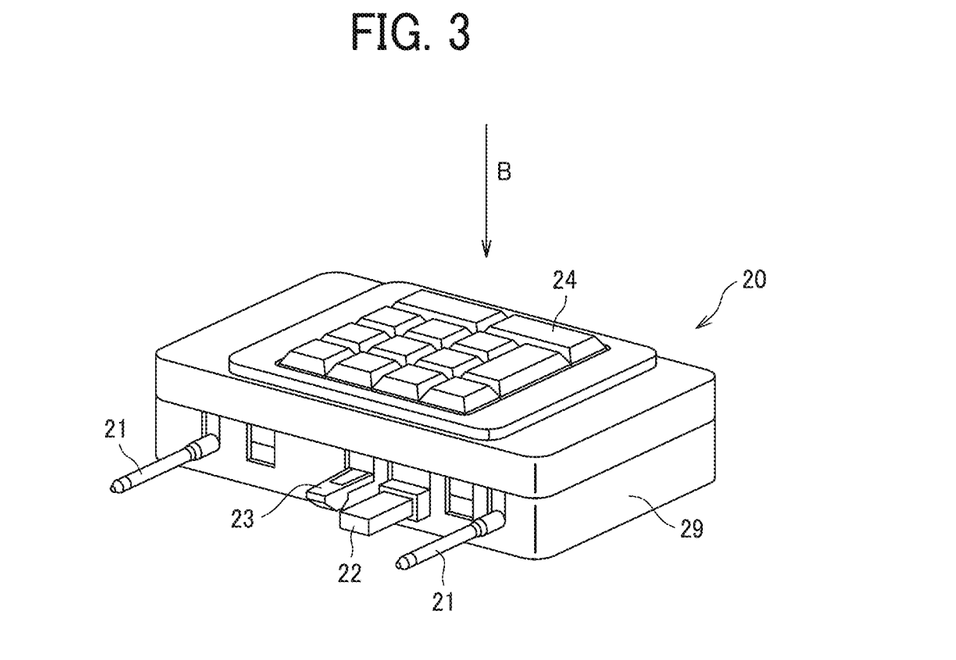
FIG. 3 is a perspective view of a numeric keypad device.

As illustrated in FIG. 3, the numeric keypad device 20 includes a numeric keypad device body 29, a pair of insertion pins 21 as a pair of insertion portions, a USB plug 22 as an electrical connector, a hook 23, and a numeric keypad 24. The insertion pins 21, the USB plug 22, the hook 23, and the numeric keypad 24 are provided on the same lateral side of the numeric keypad device body 29.

Each of the insertion pins 21 has a cylindrical shape and extends in a short-side direction of the numeric keypad device body 29 (i.e., a direction in which the numeric keypad device 20 is inserted into the operation panel 10). In other words, the insertion pins 21 extend in a direction parallel to an upper surface of the numeric keypad device body 29 on which the numeric keypad 24 is disposed and in a direction intersecting a longitudinal direction of the numeric keypad device body 29. The insertion pins 21 are made of metal.

The insertion pins 21 being made of a conductor can ensure grounding when the numeric keypad device 20 is electrically connected to the operation panel 10.

The pair of insertion pins 21 are arranged side by side in the longitudinal direction of the numeric keypad device body 29. One and the other of the insertion pins 21 are provided on one side and the other side, respectively, of the numeric keypad device body 29 with respect to a central position in the longitudinal direction of the numeric keypad device body 29. In the present embodiment, in particular, one and the other of the insertion pins 21 are provided in the vicinity of one end and the vicinity of the other end of the numeric keypad device body 29 in the longitudinal direction.

The numeric keypad 24 is disposed on an upper side of the numeric keypad device body 29, and the upper side is an operation surface of the numeric keypad device 20. The longitudinal direction and the short-side direction of the numeric keypad device body 29 are directions parallel to the operation surface of the numeric keypad device 20. The operator presses the numeric keypad 24 in a direction of arrow B.

Figure 4:
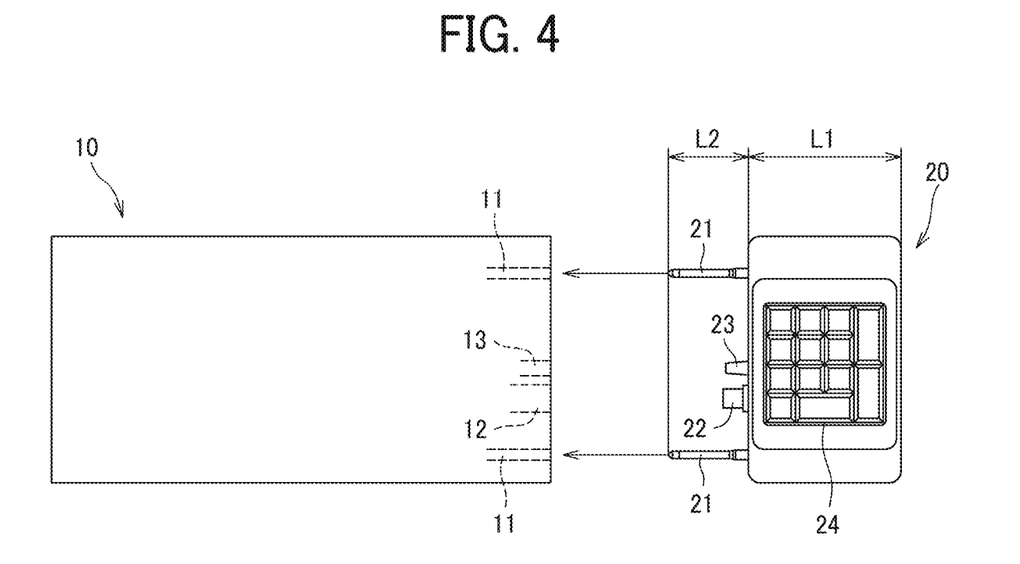
FIG. 4 is a diagram illustrating mounting of the numeric keypad device to the operation panel.

As illustrated in FIG. 4, the insertion pins 21 are inserted into the pin insertion holes 11 to mount the numeric keypad device 20 on the lateral side of the operation panel 10. At this time, the hook 23 is inserted into the hook hole 13 and is engaged with an engaged portion inside the operation panel 10. Further, the USB plug 22 is inserted into the USB slot 12 and the numeric keypad device 20 is electrically connected to the operation panel 10. Thus, input to the body of the image forming apparatus 1 with the numeric keypad 24 can be performed.

Figure 5:
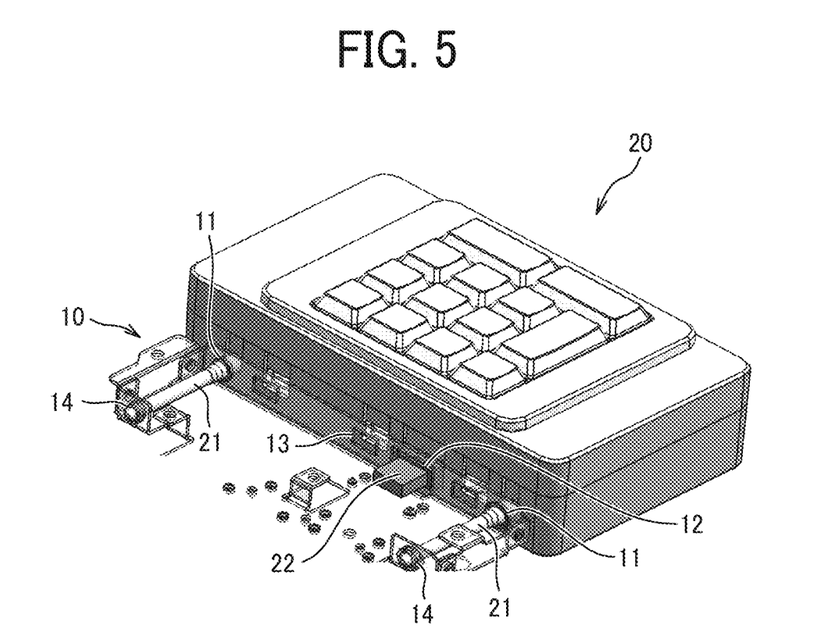
FIG. 5 is a perspective view of the numeric keypad device in a state in which the numeric keypad device is mounted to the operation panel.

FIG. 5 is a perspective view of the numeric keypad device 20 in the state in which the numeric keypad device 20 is mounted to the operation panel 10. Only frames supporting the insertion pins 21 and a peripheral structure thereof are extracted and illustrated from the operation panel 10. For the sake of convenience, the hook 23 of the numeric keypad device 20 is omitted in FIG. 5.

As illustrated in FIG. 5, the insertion pins 21 are inserted into the pin insertion holes 11 of the operation panel 10 and second insertion holes 14 provided inside of the operation panel 10. Thus, the insertion pins 21 contact the frames of the operation panel 10, and the load of the numeric keypad device 20 is supported by the operation panel 10.

As described above, in the present embodiment, only inserting the insertion pins 21 into the pin insertion holes 11 allows the numeric keypad device 20 to be mounted to the operation panel 10. Therefore, an operation such as screwing is unnecessary, and the numeric keypad device 20 can be easily mounted to and unmounted from the operation panel 10.

For example, unlike the configuration of the present embodiment, in a case of a configuration in which a dedicated mounting base to mount the numeric keypad device 20 is provided next to the operation panel 10 and the numeric keypad device 20 is mounted in the dedicated space of the mounting base, the space of the mounting base becomes a dead space in a state in which the numeric keypad device 20 is not mounted. In contrast, in the present embodiment, the load of the numeric keypad device 20 is supported by the operation panel 10 with the insertion pins 21 being inserted into the pin insertion holes 11 and contacting the inside of the operation panel 10. That is, the numeric keypad device 20 is supported by the operation panel 10 without providing a support portion such as a mount to support the numeric keypad device 20 on the body of the image forming apparatus 1 in advance. Therefore, compared with the above-described configuration, the size of the image forming apparatus 1 can be reduced by the space to hold the numeric keypad device 20.

Inside the operation panel 10, spaces into which the insertion pins 21 are inserted are provided as dead spaces in which a member such as a board is not disposed.

The numeric keypad device 20 of FIG. 3 is a button type numeric keypad. In such a case, the force with which an operator presses a button in a pressing direction (see the direction of arrow B in FIG. 3) may vary per each operator. When the operator is, for example, in a hurry or the like and presses the button vigorously, the pressing force in the direction of arrow B is larger than in a touch panel system or the like. In this regard, in the present embodiment, an extending direction of the insertion pins 21 or the insertion direction of the insertion pins 21 with respect to the operation panel 10 is a direction orthogonal to the direction of arrow B that is the pressing direction with respect to the numeric keypad 24. In this way, providing the insertion pins 21, which are supported by the operation panel 10, in the above-described direction allows the operation panel 10 and the numeric keypad device 20 to stably support the load in the pressing direction from the operator. Such a configuration can restrain rattling of the numeric keypad device 20 with respect to the operation panel 10 when the button is pressed and enhance the operability of the numeric keypad device 20.

Figure 6:
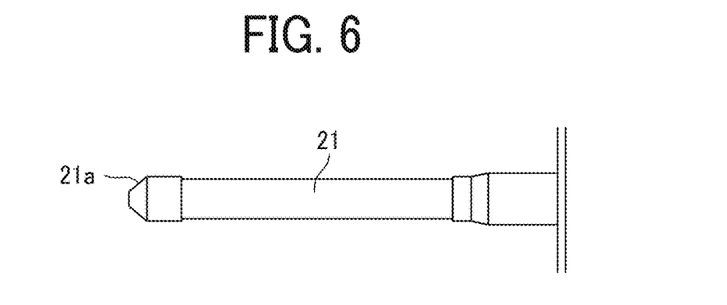
FIG. 6 is a view of an insertion pin.

As illustrated in FIG. 6, a tapered surface 21a is formed at a distal end portion of the insertion pin 21. The diameter of the tapered surface 21a decreases toward a distal end of the insertion pin 21. The insertion pin 21 can be smoothly inserted into the pin insertion hole 11 by the tapered surface 21a.

Next, a relationship between the length of the insertion pin 21 and the degree of backlash of the numeric keypad device 20 with respect to the operation panel 10 is described with reference to FIG. 7. An example case in which the numeric keypad device 20 is tilted is a case in which the numeric keypad 24 is pressed to apply a downward force in FIG. 7 to the numeric keypad device 20.

Figure 7:
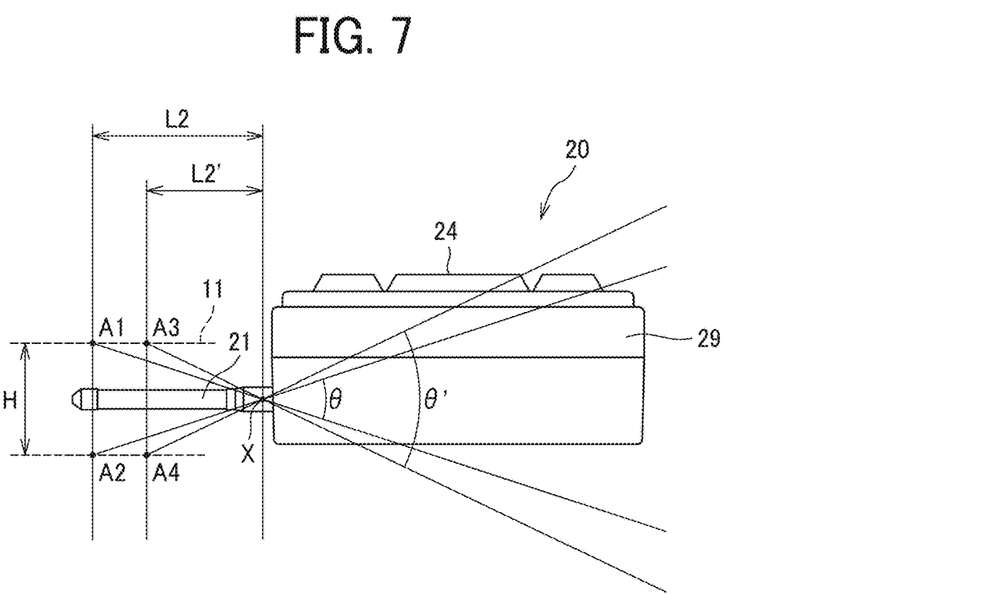
FIG. 7 is a diagram of a relationship between the length of the insertion pin and a tilt of the numeric keypad device.

As illustrated in FIG. 7, the width in which the pin insertion hole 11 in FIG. 7 is tilted in a vertical direction is a width H. A tilt of the numeric keypad device 20 in a state in which the insertion pin 21 is inserted into the pin insertion hole 11 is considered. In FIG. 7, the width H is illustrated to be considerably larger than the diameter of the insertion pin 21 for the sake of convenience of explanation. However, the difference in size is actually small. In the case of FIG. 7, when the numeric keypad device 20 is tilted in the vertical direction of FIG. 7 with respect to the operation panel 10, the numeric keypad device 20 is tilted to a position at which the distal end of the insertion pin 21 comes into contact with an upper surface or a lower surface of the pin insertion hole 11 with a supported portion X at a root of the insertion pin 21 as a fulcrum. That is, the distal end of the insertion pin 21 is tilted to a position of point A1 or point A2 in FIG. 7. At this time, the tilt of the numeric keypad device 20 with respect to a horizontal line in FIG. 7 is an angle θ including upper and lower tilts. On the other hand, if the length of the insertion pin 21 is L2' that is shorter than the length of the insertion pin 21 of the present embodiment, the distal end of the insertion pin 21 is tilted to a position of point A3 or point A4. In this case, the tilt angle of the numeric keypad device 20 in the vertical direction is an angle θ'. As illustrated in FIG. 7, the angle θ' is larger than the angle θ. As described above, the longer the length of the insertion pin 21 is, in other words, the longer the insertion length of the insertion pin 21 with respect to the pin insertion hole 11 is, and the larger the distance between the supported portion X and the distal end of the insertion pin 21 is, the tilt angle θ of the numeric keypad device 20 becomes smaller. Thus, rattling of the numeric keypad device 20 with respect to the operation panel 10 can be restrained. Accordingly, the operability of the numeric keypad device 20 can be enhanced. In consideration of the above, as illustrated in FIG. 4, the length L2 of the insertion pin 21, that is, the distance of which the numeric keypad device 20 is inserted into the operation panel 10, is more preferably set to one-third or more of the width L1 of the numeric keypad device 20 in the direction in which the numeric keypad device 20 is inserted into the operation panel 10. Thus, rattling of the numeric keypad device 20 with respect to the operation panel 10 can be restrained. The above-described supported portion X is a portion at which the load of the numeric keypad device 20 is supported by the operation panel 10 when the numeric keypad device 20 is tilted. That is, the supported portion X is a portion serving as a fulcrum when the numeric keypad device 20 is tilted in the vertical direction in FIG. 7. In FIG. 7, the supported portion X is located slightly closer to the distal end of the insertion pin 21 (i.e., the left side in FIG. 7) from the root of the insertion pin 21. This is because the numeric keypad device body 29 and the operation panel 10 interfere with each other, and the fulcrum of the insertion pin 21 is located at a position shifted from the root of the insertion pin 21.

Figure 8:
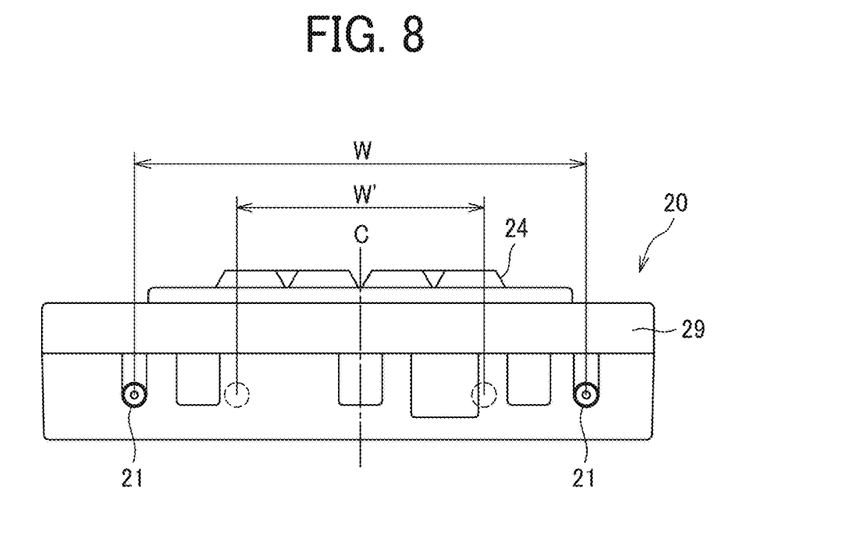
FIG. 8 is a view of an interval between the insertion pins.

As illustrated in FIG. 8, one and the other of the pair of insertion pins 21 are disposed on the one side and the other side, respectively, of the numeric keypad device body 29 (e.g., the left side and the right side in FIG. 8) with respect to a center position C in the longitudinal direction of the numeric keypad device body 29. Such an arrangement allows the operation panel 10 to support the numeric keypad device 20 on both sides in the longitudinal direction of the numeric keypad device 20. Thus, the support posture is stabilized. Accordingly, the positional accuracy of the numeric keypad device 20 with respect to the operation panel 10 is enhanced. In the present embodiment, the USB plug 22 (see FIG. 3) is provided between the insertion pins 21. Thus, the positional accuracy of the USB plug 22 can be enhanced. Accordingly, the physical connection state of the USB plug 22 to the operation panel 10 can be stabilized, thus allowing the electrical connection state to be stabilized.

Further, providing a sufficient distance between the insertion pins 21 can enhance the positional accuracy of the numeric keypad device 20 with respect to the operation panel 10. That is, as illustrated in FIG. 8, as a distance W between the insertion pins 21 increases, supported positions of the numeric keypad device 20 supported by the operation panel 10 can be disposed apart from each other. Accordingly, even when the vertical position of one of the insertion pins 21 is shifted due to an error in molding accuracy or the like, the tilt of the numeric keypad device 20 from the horizontal position with respect to the operation panel 10 can be restrained. On the other hand, if the distance between the insertion pins 21 is smaller than the distance W as in the case of a distance W', the tilt of the numeric keypad device 20 with respect to the operation panel 10 becomes larger than in the case of the distance W due to an error in the vertical positioning of the insertion pins 21. In particular, the numeric keypad device 20 is likely to tilt in the above-described direction when the operator presses the numeric keypad 24. Accordingly, providing a sufficient distance between the insertion pins 21 can effectively restrain the tilt of the numeric keypad device 20 with respect to the operation panel 10 in the vertical direction (i.e., a thickness direction of the numeric keypad device 20). Thus, the physical connection state of the USB plug 22 (see FIG. 3) to the operation panel 10 can be further stabilized, and the electrical connection state of the numeric keypad device 20 to the operation panel 10 can be further stabilized. In particular, in the present embodiment, the insertion pins 21 are provided in the vicinities of both ends of the numeric keypad device body 29 in the longitudinal direction (the left-right direction in FIG. 8), thereby making the distance W as large as possible. Such a configuration can further restrain the tilt of the numeric keypad device 20 with respect to the operation panel 10 and is more preferable.

Figure 9:
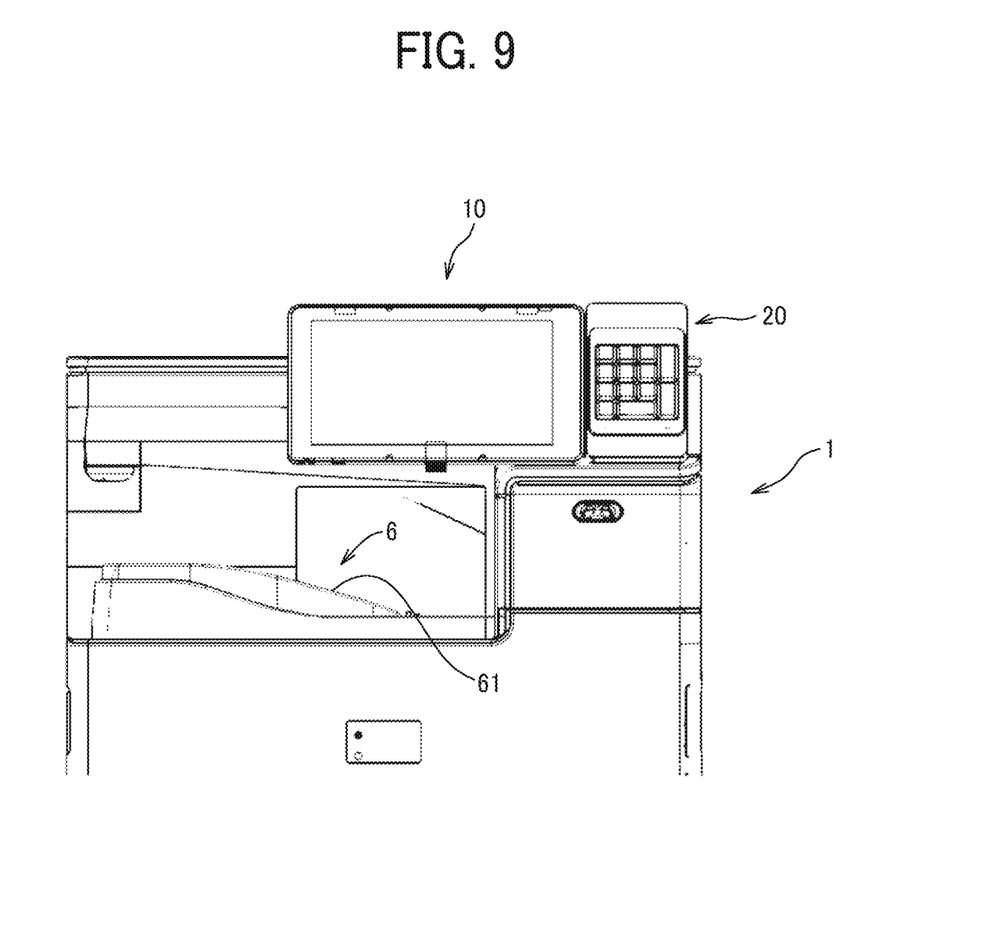
FIG. 9 is a front view of the image forming apparatus in a state in which the numeric keypad device is mounted.

As illustrated in FIG. 9, the numeric keypad device 20 is mounted to the right side of the operation panel 10 in FIG. 9 and on an opposite side of the sheet ejection device 6 provided in the image forming apparatus 1. Thus, the numeric keypad device 20 does not interfere with an operation of taking out sheets of paper from the sheet ejection tray 61.

The present disclosure is not limited to the embodiments described above, and various modifications and improvements are possible without departing from the gist of the present disclosure.

For example, an image forming apparatus according to an embodiment of the present disclosure is not limited to an electrophotographic image forming apparatus, and may be, for example, an inkjet image forming apparatus. Further, the above-described embodiments of the present disclosure have been described with reference to the button type numeric keypad device. However, note that the present disclosure can be applied to, for example, a touch-panel-type numeric input device.

In the above description, the numeric keypad device is illustrated as an example of the extended operation device. However, the present disclosure is not limited thereto. For example, the numeric keypad device may be an authentication device or a keyboard.

Examples of the recording medium include sheets of paper (plain paper), cardboard, postcards, envelopes, thin paper, coated paper, art paper, tracing paper, overhead projector (OHP) sheets, plastic films, prepregs, and copper foils.

In the above descriptions, the term "printing" in the present disclosure may be used synonymously with, e.g. the terms of "image formation", "recording", "printing", and "image printing".

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present disclosure.

What is claimed is:

1. An extended operation device configured to be mountable to and demountable from an apparatus body, the apparatus body including a recording medium ejection device and a body-side operation device mounted thereto, the recording medium ejection device configured to eject a recording medium on which an image has been formed onto an ejection tray, and the body-side operation device having a first lateral side and a second lateral side separated in a length direction of the body-side operation device with the first lateral side of the body- side operation device being closer to the recording medium ejection device than the second lateral side of the body-side operation device, the extended operation device comprising:
    an extended operation device body;
    an input device;
    a pair of insertion portions extending in a first direction parallel to an operation surface of the input device with respect to the extended operation device body; and
    at least one hook extending in the first direction between the pair of insertion portions,
        wherein one insertion portion and the other insertion portion of the pair of insertion portions are provided on one side and the other side, respectively, of the extended operation device body with respect to a central position of the extended operation device body in a second direction that is parallel to the operation surface of the input device and intersects the first direction, and
        wherein the pair of insertion portions are configured to be inserted into a pair of insertion holes provided in second lateral side of the body-side operation device to mount the extended operation device to the second lateral side of the body-side operation device with the extended operation device offset from the ejection tray.

2. The extended operation device according to claim 1, wherein a distal end portion of each of the one insertion portion and the other insertion portion has a tapered surface and a diameter of the tapered surface is configured to decrease toward a distal end of each of the one insertion portion and the other insertion portion.

3. The extended operation device according to claim 1, wherein a length of each of the one insertion portion and the other insertion portion in the first direction is one-third or more of a width of the extended operation device body in the first direction.

4. The extended operation device according to claim 1, wherein the one insertion portion and the other insertion portion are provided at or in vicinities of both ends of the extended operation device body in the second direction.

5. The extended operation device according to claim 1, further comprising:
    an electrical connection device disposed between the one insertion portion and the other insertion portion and configured to electrically connect the extended operation device to the apparatus body.

6. The extended operation device of claim 5, wherein the electrical connection device is a male Universal Serial Bus (USB) connector, and the body-side operation device includes a female USB port on the second lateral side thereof.

7. The extended operation device according to claim 1, wherein the extended operation device is a numeric keypad device including a numeric keypad.

8. An image forming apparatus comprising the apparatus body,
    wherein the extended operation device according to claim 1 is mountable to and demountable from the apparatus body.

9. The image forming apparatus according to claim 8, further comprising:
    the body-side operation device; and the recording medium ejection device configured to eject the recording medium on which an image has been formed.

10. The extended operation device of claim 1, wherein the body-side operation device does not include a mounting base extending from the second lateral side to support the extended operation device.

11. The extended operation device of claim 1, wherein a combined length of the body-side operation device and the extended operation device in the length direction increases when the extended operation device is mounted thereto.

12. The extended operation device of claim 1, wherein a distance between the pair of insertion portions in the second direction is greater than a width of the input device in the second direction.

13. The extended operation device of claim 12, wherein the distance between the pair of insertion portions in the second direction is such that no input devices are present between each of the pair of insertion portions and a side of the extended operation device body closest thereto.

14. The extended operation device of claim 13, wherein the at least one hook is centered between the furthest ones of the input devices in the second direction.

15. The extended operation device of claim 1, wherein the at least one hook is configured to penetrate respective hook holes to engage with engaged portions within the body-side-operation device.

* * * * *